(12) United States Patent
Botta

(10) Patent No.: US 10,155,169 B2
(45) Date of Patent: Dec. 18, 2018

(54) VIDEO GAME APPARATUS FOR ACTIVE STATE COMPOSITION OF ITEMS AND GAME PROGRAM FOR SAME

(71) Applicant: SQUARE ENIX HOLDINGS, CO., LTD, Tokyo (JP)

(72) Inventor: Jason Botta, Redwood City, CA (US)

(73) Assignee: SQUARE ENIX HOLDINGS, CO., LTD., Tokyo (JP)

(*) Notice: Subject to any disclaimer, the term of this patent is extended or adjusted under 35 U.S.C. 154(b) by 0 days.

(21) Appl. No.: 15/340,409

(22) Filed: Nov. 1, 2016

(65) Prior Publication Data

US 2018/0117476 A1    May 3, 2018

(51) Int. Cl.
| | | |
|---|---|---|
| A63F 13/822 | (2014.01) | |
| A63F 13/58 | (2014.01) | |
| A63F 13/25 | (2014.01) | |
| A63F 13/537 | (2014.01) | |
| A63F 13/40 | (2014.01) | |
| A63F 13/42 | (2014.01) | |
| A63F 13/5375 | (2014.01) | |
| A63F 13/69 | (2014.01) | |

(52) U.S. Cl.
CPC ............ *A63F 13/822* (2014.09); *A63F 13/25* (2014.09); *A63F 13/40* (2014.09); *A63F 13/42* (2014.09); *A63F 13/537* (2014.09); *A63F 13/5375* (2014.09); *A63F 13/58* (2014.09); *A63F 13/69* (2014.09); *A63F 2300/609* (2013.01)

(58) Field of Classification Search
CPC ........ A63F 13/40; A63F 13/42; A63F 13/537; A63F 13/5375; A63F 13/58; A63F 13/822; A63F 2300/609
See application file for complete search history.

(56) References Cited

U.S. PATENT DOCUMENTS

| | | | | |
|---|---|---|---|---|
| 2005/0026695 | A1* | 2/2005 | Tsuchiyama | ............ A63F 13/12 463/42 |
| 2007/0155508 | A1* | 7/2007 | Sun | ......................... A63F 13/12 463/42 |

OTHER PUBLICATIONS

Recipe. Wowpedia [online]. Jun. 5, 2014 [retrieved on Jan. 26, 2018]. Retrieved from the Internet: <URL: https://wow.gamepedia.com/Recipe >.*

* cited by examiner

*Primary Examiner* — David Duffy
(74) *Attorney, Agent, or Firm* — Duane Morris LLP

(57) ABSTRACT

A game apparatus has a section that judges whether a player character is in an active state, a storage that stores obtained material items, a storage that stores combinations of material items for composing a composed item, and a section that read the combination of the material items for composing the composed item when an instruction of composing the composed item is outputted, producing the composed item with the stored material items and provide the player character with the composed item that is able to use, whereby the composed item is produced in a state the player character is in an active state.

4 Claims, 10 Drawing Sheets

FIG. 4

| MATERIAL ITEM | IMAGE | GROUP | ITEM NAME |
|---|---|---|---|
| T001 | | A | INGOT |
| T002 | | B | CLOTH |
| T003 | | A | PRECIOUS STONE |
| T004 | | C | MEDICAL HERB |

FIG. 6

| ARMS EQUIPPED | BATTLE ITEM | NUMBER OF EQUIPMENT | IN USE |
|---|---|---|---|
| BOW | C094 | 25 | 0 |
| RIFLE | C185 | 40 | 1 |
| SHOT GUN | C113 | 38 | 0 |

ARM — ARMS EQUIPPED
CN — BATTLE ITEM (CT)
NN — NUMBER OF EQUIPMENT
FG — IN USE
TB4

FIG. 9

|  | IDENTIFICATION CODE | NUMBER OWNED |
|---|---|---|
| MN | T001 | 1 |
| MN | T006 | 8 |
|  | T026 |  |
| CN | C002 | 3 |
| CN | C008 | 1 |

TB3

VIDEO GAME APPARATUS FOR ACTIVE STATE COMPOSITION OF ITEMS AND GAME PROGRAM FOR SAME

TECHNICAL FIELD

The invention relates to a video game apparatus and a game program through which a different item is able to be composed from two or more material items at an optional point in time at an optional site on a field, and a battle item fitting to arms with which the player character is equipped is also able to be composed at an optional point in time at an optional site on the field.

BACKGROUND ART

A well-known conventional configuration of a video game, such as an adventure game and a role-playing game is that various kinds of items are searched and obtained by moving a player character on a field, and a different item is composed from the thus obtained items as materials and the composed item is used in the game so as to advance a scenario.

DISCLOSURE OF INVENTION

Problems to be Solved by Invention

Generally, the item is composed at an item composition base specifically provided on the field, such as an atelier or a studio, and in order to compose the item, it is necessary for the player character to be moved to the item composition base.

Also for the battle items, such as ammunitions, bows and arrows and bombs, that are used for the arms with which the player character is equipped, the items are composed. In order to get the player character to compose such an item, it is necessary for the player to recognize the arms with which the player character is presently equipped and is using, and to know the combination of the materials for composing the battle item to be used for the arms.

But, it is extremely complicated work to move to the item composition base whenever the player is going to compose the item. Besides, it is a big burden for the player to confirm the arms with which the player character is presently equipped and presently uses, to select the material items for composing the battle item corresponding to the arms, and compose the item whenever composing the item. That is, at the time of composing the item, it is necessary for the player to frequently operate operation keys for selecting the material items and selecting the arms to be used, and the necessity of such a complicated controller operation is a big burden for the player. When the player character is moved to an item composition base due to the shortage of some item and a complicated item composition operation is done through a controller during the progress of a series of scenarios on the field, the previous flow of the scenario is stopped, thereby damaging the player's interests in the game.

In view of the circumstances mentioned before, the object of the present invention is to provide the video game apparatus and the game program for immediately composing the item at an optional point in time at an optional site on the field, and immediately composing the battle item of the arms with which the player character is equipped and uses at an optional point in time at an optional site on the field.

Means for Solving Problems

A first aspect of the invention is a game apparatus (1) for advancing a scenario in such a way that a player character (PC) is moved on a field (FLD) produced in a three dimensional virtual space in a memory through a controller (10) so as to obtain material items located on the field and to compose a predetermined composed item by combining two or more material items obtained, comprising:

an active state judger (7) that judges whether the player character on the field is in such an active state that the player character is able to immediately execute an operation command from a player;
a material item storage (TB3) that stores the material items obtained by the player character;
a composed item storage (TB5) that stores a combination of the material items for composing the composed item;
a composition instruction judger (7) that judges whether an instruction of producing the composed item is outputted when the player character is in the active state; and
a composed item provider (7, 9) that when the instruction of composing the items is outputted, reads out a combination of the material items for producing the composed item shown in the composed item storage, produces the composed item with the material items that are stored in the material item storage based upon the read combination of the material items, and provides the player character with the composed item that the player character is able to use;
whereby the composed item is produced in a state that the player character is in the active state.

A second aspect of the invention is the game apparatus (1), wherein the composed items include a battle item (CT) to be used for the arms (ARM), further comprising an equipped arms storage that stores an arms table (TB4) that shows the arms the player character is using and the battle item corresponding to the arms, whereby the composed item provider composes the battle item corresponding to the arms that the player character is presently using, as identified in the arms table.

A third aspect of the invention is the game apparatus (1), wherein the arms table stores two or more arms with which the player character is able to be equipped and two or more battle items corresponding to these arms, and the arms that the player character is using is stored in the arms table as an arms with which the player character is able to be equipped.

A fourth aspect of the invention is the game apparatus (1), wherein the composed items include a recovery item for recovering a physical power of the player character, and the composed item provider successively executes the composition of the recovery item and a process of recovering the physical power of the player character with the composed recovery item if the instruction of composing the item comprises composing the recovery item.

A fifth aspect of the invention is the game apparatus (1), wherein the arms table stores arms usage information that shows the arms the player character is using, and the composed item provider determines the arms that the player character is presently using by referring to the arms usage information stored in the arms table.

Effects of Invention

According to the invention, it is possible to produce the composed item, such as the recovery item and the battle item, at an optional point in time at an optional site on the field in real time when the player character (PC) is in the active state on the field (FLD) and to provide the composed item, and to improve the reality of the video game and to offer a high quality game.

Besides, the battle item can be immediately composed as long as it is used for the arms that the player character is presently using. Even if the player character who is in the active state is in a fighting state with the enemy character, it is possible to compose and provide a proper battle item.

The number in parentheses shows the corresponding element in the drawings for the sake of convenience. Accordingly, the descriptions are not restricted and bound by the references to the drawings.

BRIEF DESCRIPTION OF DRAWINGS

FIG. 4 is a view that shows an instance of a mat item table.

FIG. 6 is a view that shows an instance of an arms table.

FIG. 9 is a view that shows an instance of an owned item table.

EMBODIMENTS FOR CARRYING OUT THE INVENTION

An embodiment of the invention is now explained, referring to the appended drawings.

Figure 1:
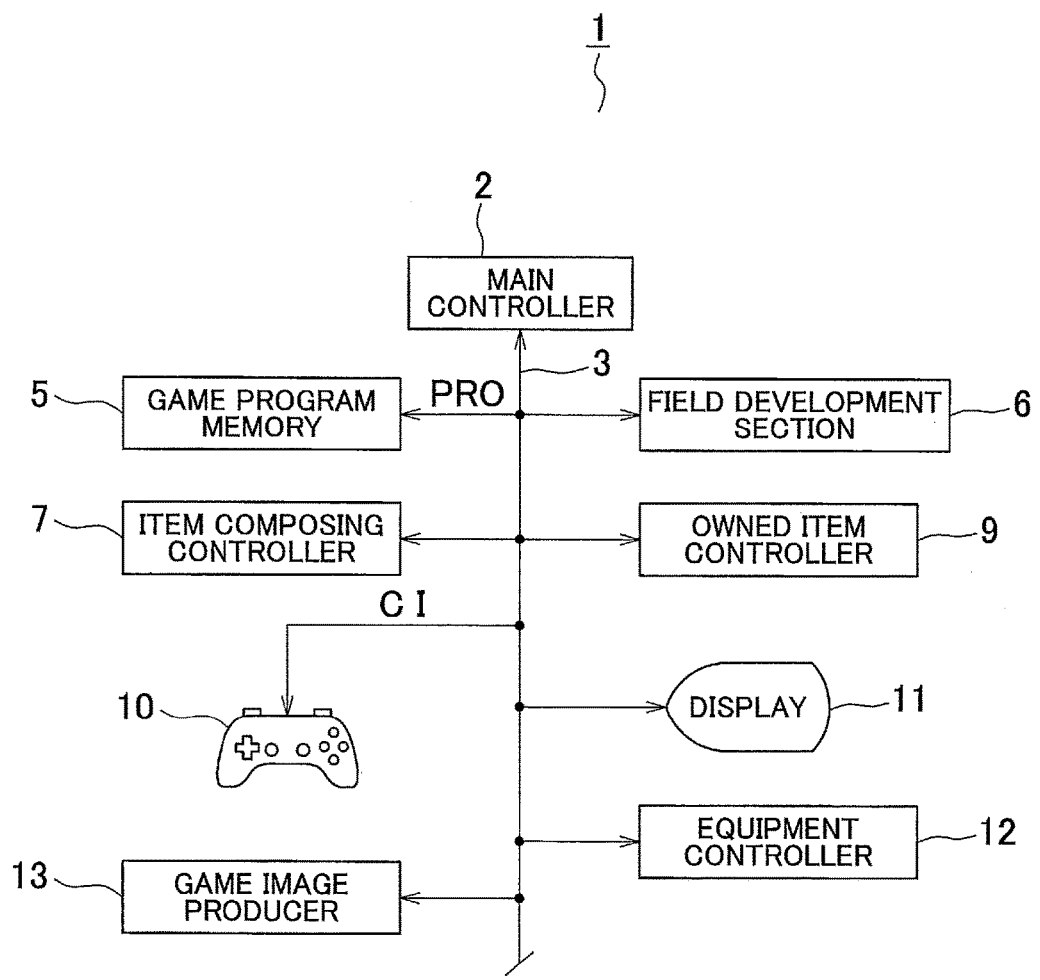
FIG. 1 is a control block diagram that shows an instance of a video game apparatus to which the present invention is applied.

As shown in FIG. 1, a video game apparatus 1 as a computer to which the present invention is applied has a main controller 2. A game program memory 5, a field development section 6, an item composing controller 7, an owned item controller 9, a controller 10, a display 11, an equipment controller 12 and a game image producer 13 are connected with the main controller 2 via a bus line 3.

Respective blocks of the main controller 2, the game program memory 5, the field development section 6, the item composing controller 7, the owned item controller 9, the equipment controller 12 and the game image producer 13 that comprise the video game apparatus 1 as shown in FIG. 1 are typically shown for easily understanding the present invention, but actually function as a computer comprising a CPU, a memory and various kinds of control programs. The video game apparatus 1 executes a part of a game program PRO that is mentioned hereinafter, so that the CPU of the video game apparatus 1 time-dividedly functions as respective function blocks of FIG. 1, but may be configured such that a part of the respective function blocks or all such blocks as shown in FIG. 1 are dedicated hardware and/or software.

The video game apparatus 1 has the above-mentioned configuration. When a player plays the game with the video game apparatus 1, the main controller 2 displays a predetermined game image IM on the display 11 through the game image producer 13 and the like based upon the game program PRO stored in the game program memory 5 via wireless, a communication line, such as a cable, or memory elements with a well-known method, so that a play environment of the game is regulated.

Figure 2:
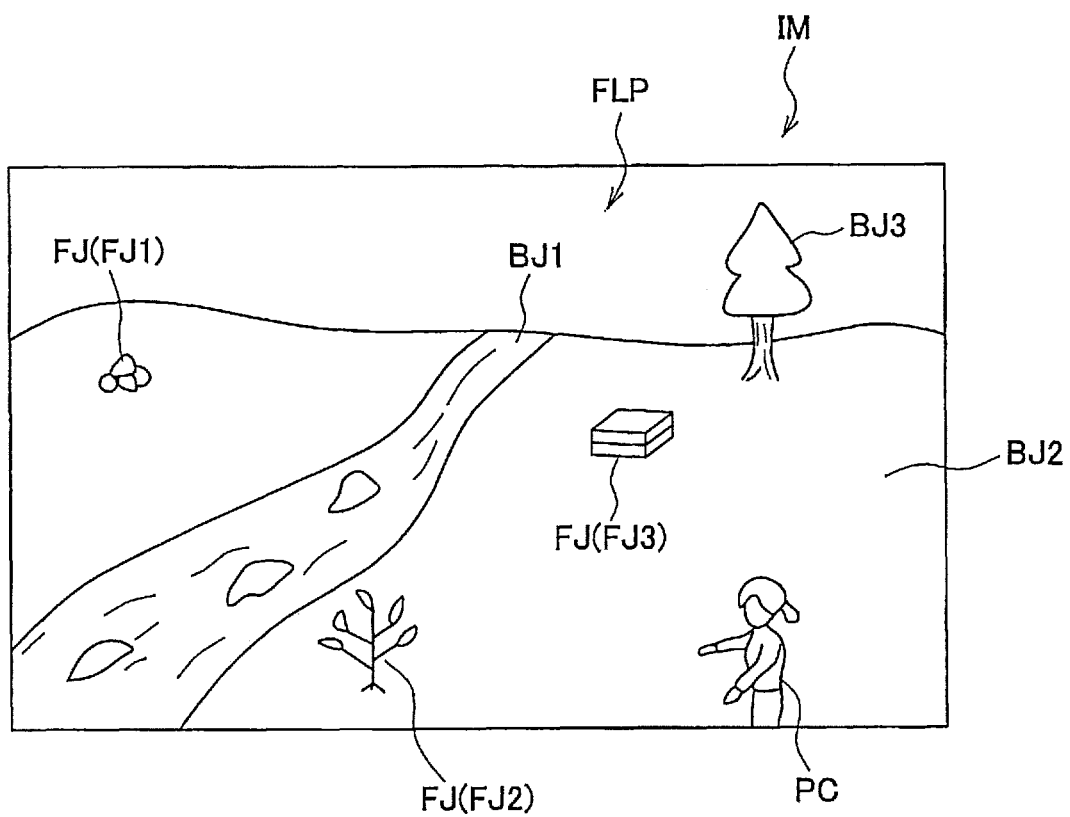
FIG. 2 is a view that shows an instance of a field displayed on a display.

In order to do so, a field FLD where a player character can move based upon the game program PRO is produced in a three dimensional virtual space produced in a memory space in the game image producer 13, and objects, such as a river BJ1, a ground BJ2, a tree BJ3, a player character PC and the like, are located on the field FLD based upon the game program PRO, as shown in FIG. 2, for instance. In such a state, a two dimensional image is produced and the game image IM is displayed on the display 11 through a rendering process from a proper position in the three dimensional space with a virtual camera. Such an image generating technology with CG is well known and the explanation is not mentioned.

Figure 3:
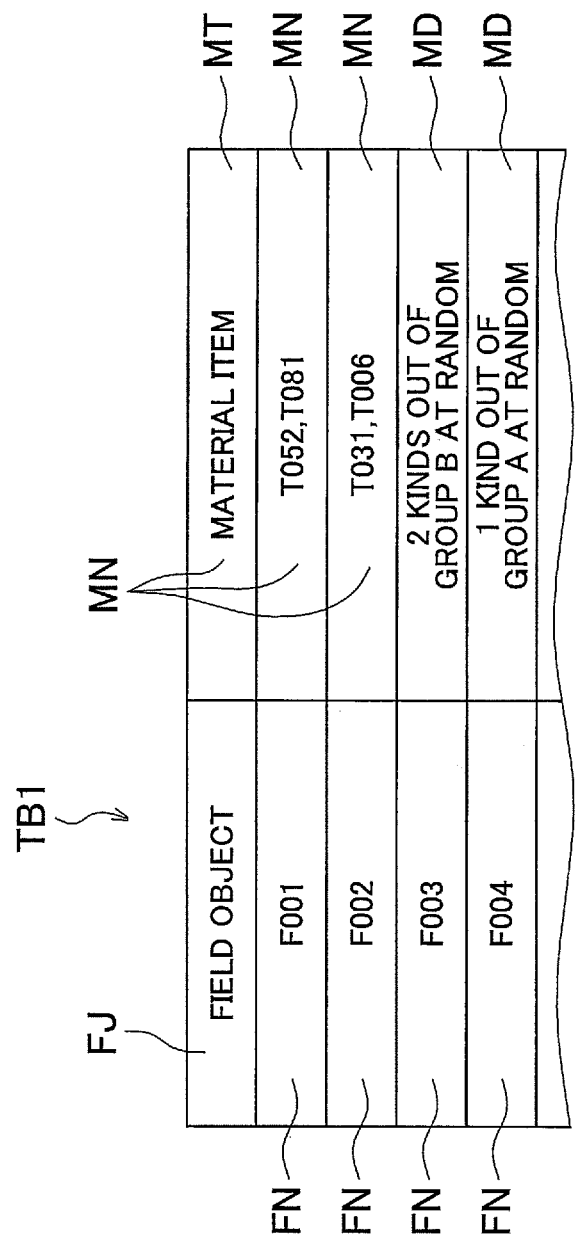
FIG. 3 is a view that shows an instance of a field object table.

As shown in FIG. 2, the field development section 6 locates two or more field objects FJ as objects at predetermined positions of the field FLD through the game image producer 13 based upon the game program PRO, and as shown in FIG. 3, specific identification numbers FN are attached to the respective field objects FJ and controlled by the main controller 2 through the game program PRO. The field objects FJ on the field FLD have various kinds of shapes. For instance, the field object FJ1 has a shape of an ore, and the field object FJ2 has a shape of a tree and the field object FJ3 has a shape of a box in case of FIG. 2.

These, field objects FJ are set so that the player character PC, that is controlled to freely move on the field through the game program PRO based upon the operation of the controller 10 by the player, can freely obtain, and material items MT are set on the field object FJ and are stored in a memory as belongings of the player character PC by obtaining the field object FJ on the field FLD by the player character PC. That is, a field object table TB1 is set and stored in the game program memory 5 through the main controller 2 according to the game program PRO, as shown in FIG. 3, and the field object table TB1 stores all field objects FJ located on the field FLD, respectively having identification codes FN. The material item MT that will be belongings of the player character PC when obtaining the field object FJ based upon the game program PRO is set on each field object FJ by the identification code MN, and one or more material item MT are set on each field object FJ.

A predetermined material item MT is not set on some field objects FJ (for instance, the field objects FJ which the identification codes FN are 0003 and 0004 as shown in FIG. 3), but only selection method MD of the material item MT to be the belongings of the player character PC may be set thereon. In such a case, the material item MT that will be the belongings of the player character PC is determined by the method shown in the selection method MD. The main controller 2 controls based upon the game program PRO such that two kinds of material items MT are determined at random out of ones belonging to a group B in the case of the field object FJ which identification code is F003 in FIG. 3, and one kind of material items MT is determined at random out of ones belonging to a group A in the case of the field object FJ which identification code is F004.

Figure 4:
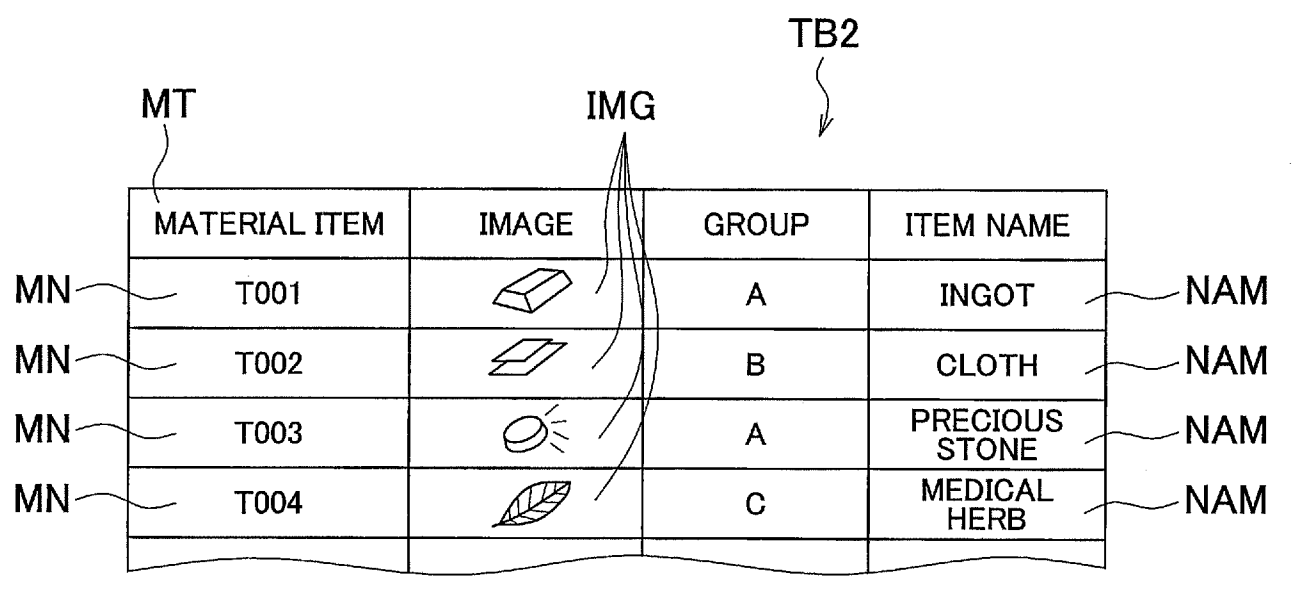

As shown in FIG. 4, all the material items MT to be used in the game are stored in the game program memory 5 as a material item table TB2 based upon the game program PRO, and the respective material items MT are stored, having the identification codes MN in the material item table TB2. The material item table TB2 stores graphic images IMG at the time of displaying the respective material items MT on the display 11, groups to which the material items MT belong, such as "A", "B" and "C", and names NAM of the respective material items MT in the game, corresponding to the respective identification codes MN. The groups of the material items MT are classified into plural groups of every category of the material item, and the group "A" is classified into the category of "ore", the group "B" is classified into the category of "fiber" and the group "C" is classified into the category of "plant", for instance. In this case, the classification of the category and the definition are optional, and the classification may be that two or more categories are given to the same material item MT. This category of the material item MT is used when determining the material item MT which the player character PC obtains by taking the field object FJ, but such a usage is not limited.

The material item MT thus obtained by the player character PC is stored in a proper memory as an owned item table TB3 as shown in FIG. 9 through the owned item controller 9 based upon the game program PRO. The owned item table TB3 stores the material items MT and composed items mentioned hereinafter that the player character PC obtains and composes on the field FLD together with these identification codes MN (material items), CN (composed items) and the numbers of these items owned, and the player immediately knows the items (excluding arms) which the player character PC presently owns by referring to the owned item table TB3. The game program PRO controls so that the player character PC is able to freely use the material items and composed items that are stored in the owned item table TB3 under his/her ownership.

The player character PC who moves on the field FLD is possible to be equipped with two or more arms, and the equipment controller 12 stores and controls the arms with which the player character PC is equipped in a proper memory as an arms table TB4 based upon the game program PRO. As shown in FIG. 6, the arms table TB4 stores the arms ARM with which the player character PC is presently equipped, battle items CT, such as ammunitions, bows and arrows, bombs that are used for the arms, numbers NN of the battle items CT presently equipped and flags FG showing whether the equipped arms are presently in use or not. The game program controls so as to select only one arms out of the arms ARM presently equipped as the arms ARM the player character PC is able to use on the field FLD through the controller 10 so as not to use two or more arms at the same time although the arms can be properly changed by operating the controller 10. The arms ARM which the player character PC is able to presently use are the arms for which the "in use flag" FG is "1" that is the arms usage information of the arms table TB4, and the player character PC is not able to use the arms for which the "in use flag" FG is "0" (shooting of the battle items, such as the bullets and the arrows is not possible).

Figure 7:
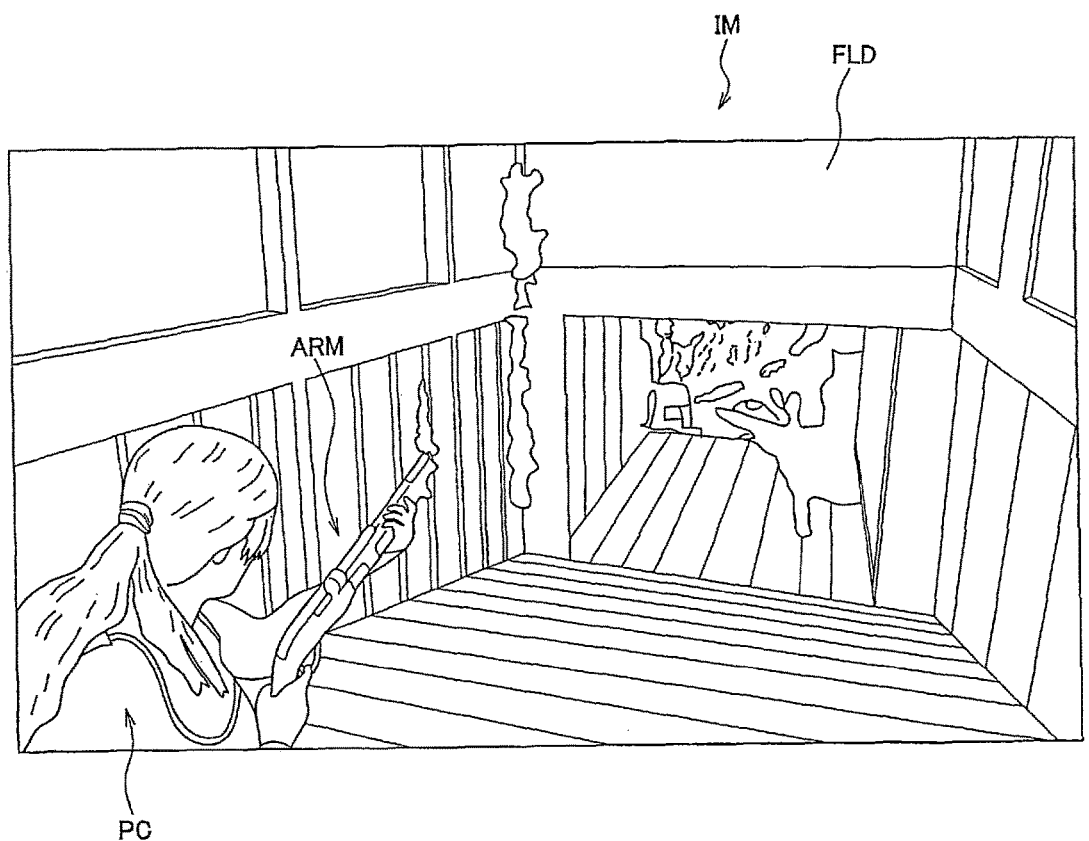
FIG. 7 is a view that shows an instance of a game screen on the field.

The player character PC is able to "use" the battle item CT that is set on the arms ARM that is presently used by an instruction from the player through the controller 10. For instance, in the game image IM as shown in FIG. 7, a shooting action of bullets or arrows is produced by the game image producer 13 and is displayed on the display 11. When using the battle item CT in the game, the equipment controller 12 subtracts the number of the battle items CT that the player character PC used from the number of equipment NN of the battle items CT corresponding to the used arms ARM in the arms table TB4 and updates the number NN. When the number of equipment NN of the battle item CT of the arms table TB4 becomes "0 (zero)", the arms ARM corresponding to the battle item CT is not possible to be used. Then, the player composes the battle item CT through the instruction of composing the battle item CT mentioned hereinafter, or the arms ARM the player character PC is presently using is changed through the controller 10, and the arms which number of equipment NN is "1" or more, is used.

The number of equipment NN (the remaining bullets) of the battle items CT of the arms that are in use is displayed at a proper position on the game screen IM together with the image that shows the arms ARM in use at the time of using the battle item CT of the arms ARM in the game.

The main controller 2 sets a predetermined physical power value on the player character PC in a proper memory through the game program PRO, and a predetermined value is subtracted therefrom by receiving attacks from an enemy character through a battle or the like and the value is renewed. When the physical power value becomes "0 (zero)", the player character PC is impossible to act. Therefore, the game program PRO operates such that before the physical power value of the player character PC becomes "0" and it is impossible for the player character PC to act, the player is instructed to use a recovery item through the controller 10 so as to recover the physical power value of the player character PC with the recovery item. The number of the recovery items that the player character PC owns is easily determined by referring to the owned item table TB3 as shown in FIG. 9, and it is possible to use the recovery items within the bounds of the number of owned recovery items shown in the table TB3.

The recovery item is used by the player through the controller 10, and the owned item controller 9 subtracts the number of the owned recovery items that the player (the player character PC) used from the number of owned recovery items of the table TB3 and updates the number. If the number of the owned recovery item becomes "0", the player can no longer use the recovery item. Then, the program enters a process of composing the recovery item in item composing program ICP mentioned hereinafter. Whenever outputting the instruction of using the recovery item from the controller 10, the recovery item may be composed according to the item composing program ICP so as to use the recovery item without controlling the recovery items through the owned item table TB3.

The game program PRO sets the battle items CT, such as the ammunitions, the bows and arrows and the bombs to be used for the respective arms ARM, as the composed items produced by composing two or more material items MT, and these composed items are stored in the arms table TB4 as the identification code CN. For instance, "bow and arrow" are set in the game as the battle item used for the arms "bow", and "bow and arrow" is set as the composed item on which the identification code CN "C094" is set, as shown in FIG. 6. And, "rifle bullet" is set in the game as the battle item used for the arms "rifle", and "rifle bullet" is set as the composed item on which the identification code CN "C185" is set, as shown in FIG. 6. Besides, "shot" is set in the game as the battle item used for the arm "shot gun", and "shot" is set as the composed item on which the identification code CN "C113" is set, as shown in FIG. 6.

As already mentioned, the composed items produced by composing the material items MT are set in the game program PRO as the items that the player character PC is able to use in the game as well as the material items MT mentioned before, and are controlled by the item composing controller 7 through the game program PRO. The item composing controller 7 stores the composed item table TB5 in a proper memory, as shown in FIG. 5, and the composed item table TB5 stores identification codes CN of the respective composed items and combination lists LST of the material items MT necessary for producing the composed item.

Figure 5:
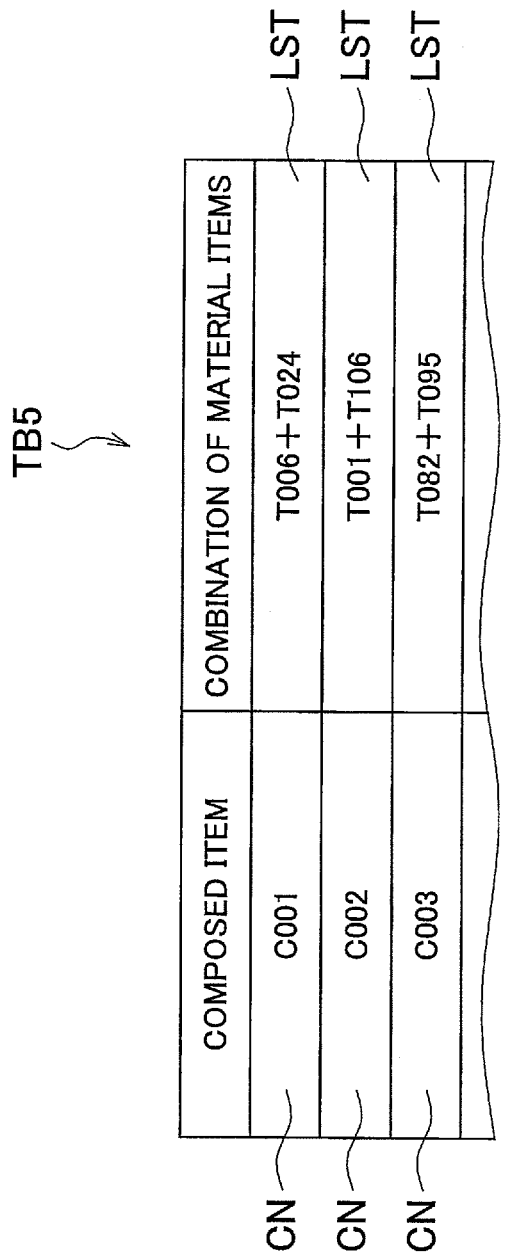
FIG. 5 is a view that shows an instance of a composed item table.

In a case as shown in FIG. 5, for instance, the combination lists LST show the composed item which identification code CN is "C001" is composed from the material items MT which identification codes are T006 and T024, and the composed item which identification code CN is "C002" is composed from the material items MT which identification codes are T001 and T106, and the composed item identification code CN is "C003" is composed from the material items MT which identification codes are T082 and T095. The number of kinds of the material items MT for producing the composed item is optional, and two or more kinds of the material items MT may be combined.

As a matter of course, the game program PRO sets such that the composed item table TB5 stores the combination lists LST of the material items also for the composed items comprising the respective battle item CT shown in the arms table TB4 of FIG. 6, and the item composing controller 7 composes "the rifle bullets" having identification code CN "C185" (as shown in FIG. 6) from two or more material items MT, referring to the composed item table TB5, for instance. It is similar also for "the bow and arrow" which identification code CN is "C094" and "the shot" which identification code CN is "C113".

As already mentioned, the composed item table TB5 also stores the recovery items for recovering the physical power of the player character PC in the game as the composed items, attaching proper identification codes CN, together with the combination lists LST, and it is possible to also compose the recovery item from the combination of the material items MT owned by the player character PC.

The player character PC is able to freely move on the field FLD based upon the operation of the controller 10 by the player according to the game program PRO. The composition of the items on the field FLD is now mentioned.

The following explanation refers to immediate composition of the recovery item and the battle item CT on the field FLD. When immediately producing the composed item on the field FLD, it is not necessary to return to a composition base each time, and the immediate composition is able to apply to any item composition as long as the scenario progress of the game is promoted by such an item.

Figure 10:
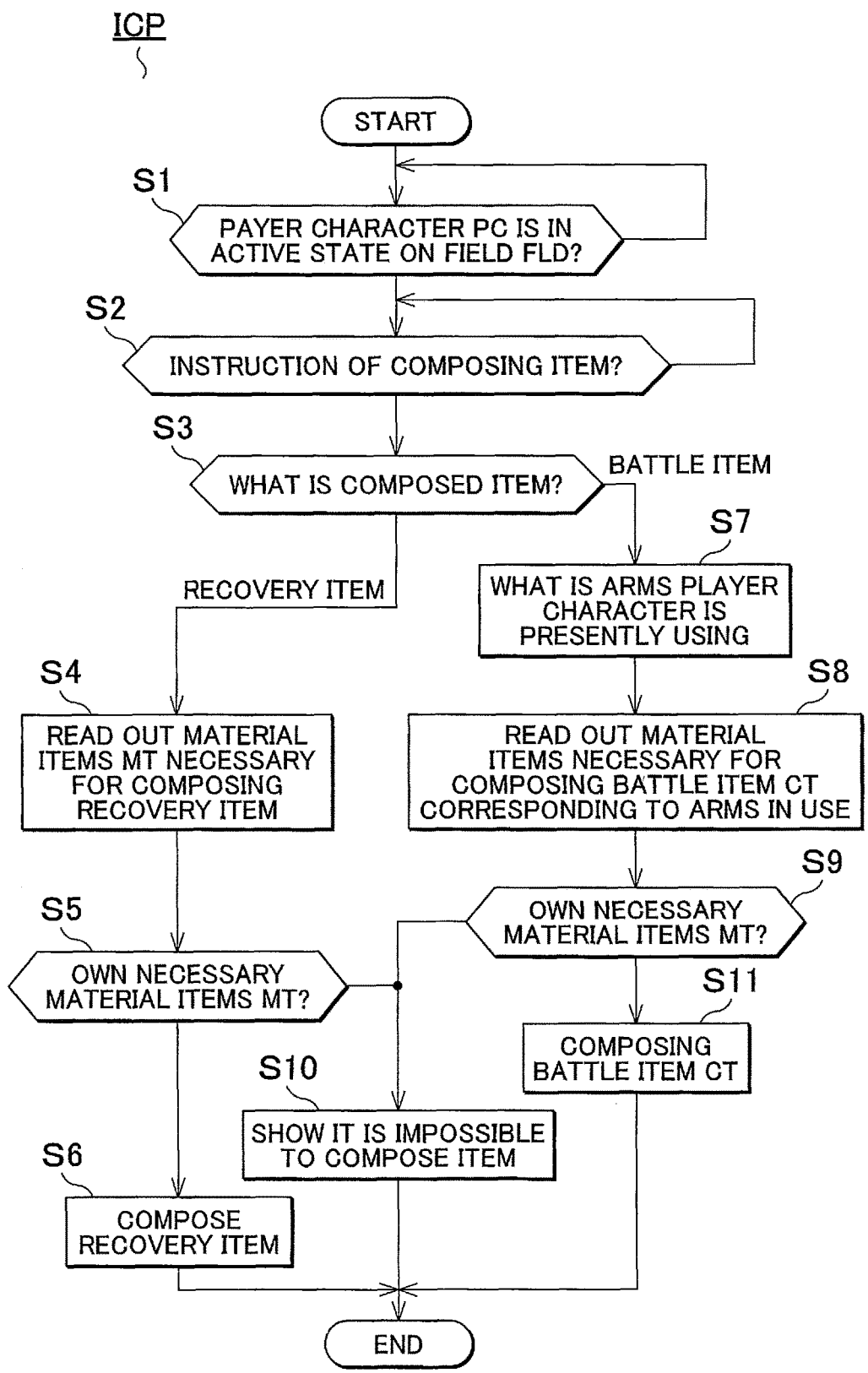
FIG. 10 is a flowchart that shows an instance of an item composition program.

While the player character PC moves on the field FLD, the item composing controller 7 controls the operation of immediate composition of the items on the field FLD based upon the item composition program ICP as shown in FIG. 10 according to the game program PRO.

That is, as shown in FIG. 10, the item composition program ICP always monitors in Step S1 whether the player character PC exists on the field FLD and is in a state of immediately receiving and executing the operation command (the instruction, such as a movement, attack and treatment) by the player through the controller 10 ("the active state" hereinafter), and executes the following steps only when the player character PC is in the active state on the field FLD.

The active state is such a scene that the player character PC is fighting with the enemy character with "the shot gun" as the arms ARM in an object of a building that is formed on the field FLD, as shown in FIG. 7, for instance. In this case, the player character PC is able to immediately shoot "the shot" as the battle item CT with the arms ARM by the instruction from the player through the controller 10, and then, such a state shows the player character PC is in the active state. Such a state that the player temporarily makes the game a stop state, or the player opens the other window on the display 11 and the player character PC is not able to immediately execute the operation command from the player even if the player character PC is on the field FLD is not the active state.

When the judgement in Step S1 is that the player character PC is on the field FLD and is in the active state, the program enters Step S2 and judges whether the item composition command CI is outputted from the controller 10. When the item composition command CI is outputted, the program enters Step S3 and judges and identifies the items which the player instructed to compose. In order to instruct the item composition, the player is able to operate various operation keys located on the controller 10, corresponding to the items that are expected to be composed.

When the composed item that is instructed to be composed is judged to be the recovery item, the program enters Step S4, and the item composing controller 7 reads out the combination list LST necessary for producing the recovery item that was instructed to be composed by referring to the identification code CN of the composed item table TB5, and whether the player (the player character PC) presently owns these material items MT is judged through the owned item controller 9, referring to the owned item table TB3 of FIG. 9 (Step S5). If the judgement is that the player character PC does not own the material items necessary for the composition of the recovery item, the program enters Step S10, and the display 11 indicates that it is not possible to compose the recovery item due to a shortage of the material items MT, and the item composition program ICP finishes.

If the judgment in Step S5 is that the player character PC owns the material items MT shown in the combination list LST of the material items necessary for the composition of the recovery item, the item composing controller 7 immediately composes the recovery item instructed. When the recovery item is composed, the owned item controller 9 subtracts the number of the material items MT that were used for composing the recovery item from the material items MT owned by the player character PC that is shown in the owned item table TB3 of FIG. 9, referring to the corresponding identification code MN, and updates the number, and adds the number of the newly produced recovery item by referring to the corresponding identification code CN. By doing so, the recovery item is provided to the player character on the field FLD for use.

In this case, the main controller 2 may control through the game program PRO such that the player character PC does not always own the recovery item, and at the time when the player instructs to compose the recovery item, both processes, the process of the composition and the process of recovery of the physical power of the player character PC with the recovery item, are successively done. By doing so, it is not necessary for the player (the player character PC) to own extra recovery items, to use the remaining material items for producing the other composed item and to increase strategic performance and enjoyment of the game.

If the composed item that the player instructs to compose in Step S3 of the item composition program ICP is the battle item, the program enters Step S7 of FIG. 10, and the equipment controller 12 judges what is the arms the player character PC is presently using, referring to the "in use flag FG" of the arms table TB4. When the arms the player character PC is presently using is determined, the battle item CT corresponding to the arms is judged to be the composed item to be produced, and the identification code CN of the composed item is judged from the arms table TB4, and the combination list LST of the material items MT necessary for the composition of the battle item CT is read out, referring to the identification code CN of the composed item table 5 through the item composing controller 7.

Subsequently, the program enters Step S9, and the owned item controller 9 judges whether the player (the player character PC) presently owns these material items MT, referring to the owned item table TB3. If the judgement is that the player character PC does not own the material items necessary for the composition of the battle item, the program enters Step S10, and the display 11 indicates it is not possible to compose the battle item due to the shortage of the material items MT, and the item composition program ICP finishes.

If the judgement in Step S9 is that the player character PC owns the material items MT shown in the combination list LST of the material items necessary for composing the battle item, the program enters Step S11, and the item composing controller 7 immediately composes the instructed battle item. When the battle item is composed, the owned item controller 9 subtracts the number of the material items MT used for the composition of the battle item from the material items MT owned by the player character PC that is shown in the owned item table TB3 in FIG. 9, referring to the corresponding identification code MN and updates the number, and the number of the newly produced battle item is added to the number of equipment NN of the battle item CT of the arms ARM in use of the arms table TB4 through the equipment controller 12. The battle item CT to be composed corresponds to the arms ARM that the player character PC is presently using, and then, it is possible to immediately compose the battle item CT and to use it for the battle even if the player character PC is in the battle with the enemy character, and to develop the game full of reality.

Besides, at the time of composition of the battle item CT, the arms ARM that the player character PC is presently using is judged and the battle item CT for the arms ARM is automatically composed. For this reason, it is not necessary for the player to stop the battle with the enemy character each time and to open a window different from the screen on the field where the player character PC fights so as to compose the battle item CT. That is, it is not necessary to perform the complex operation to take time, which extremely damages the interests of the game.

Figure 8:
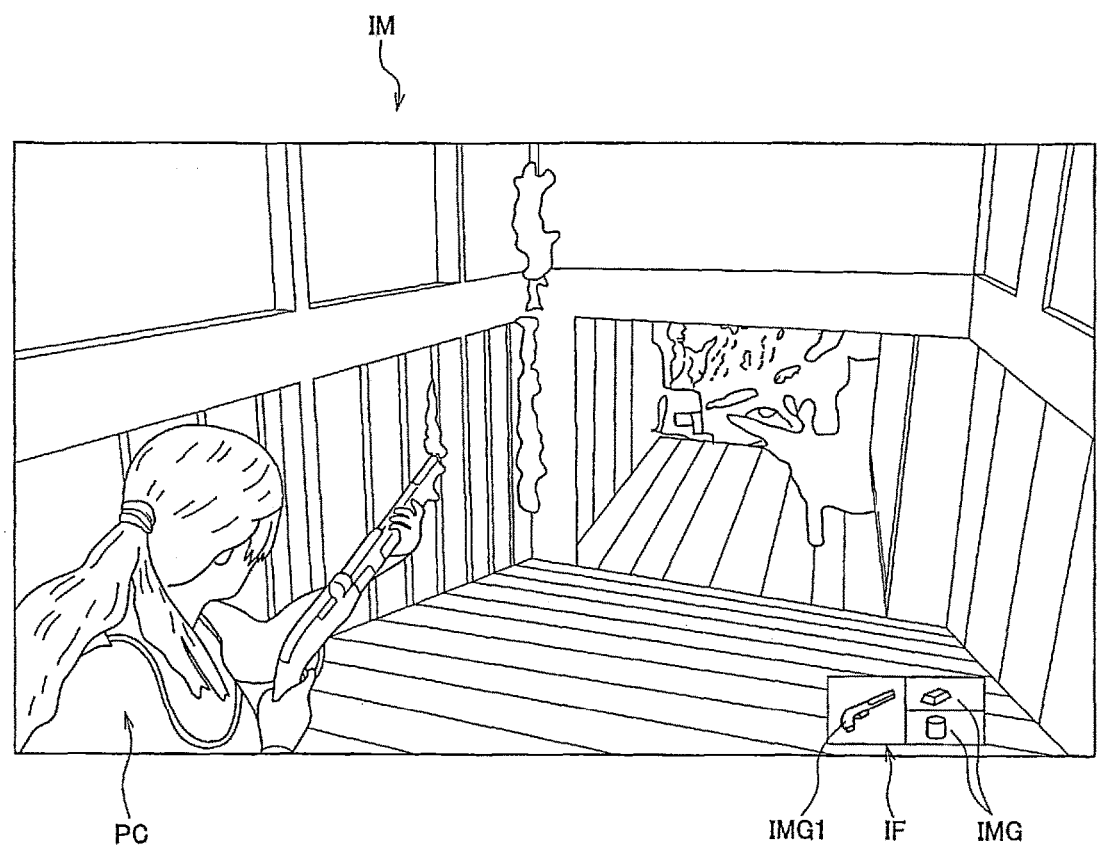
FIG. 8 is a view that shows an instance of the game screen on the field.

The recovery item or the battle item can be thus immediately composed by the player character PC by the instruction from the player at any time as long as the player character PC is in the active state on the field FLD. For instance, when the player character PC of FIG. 7 is in the active state where the player character PC fights an enemy character (not shown) and the player instructs to compose the recovery item or the battle item CT through the controller 10, the game image producer 8 shows the game image IM that is presently displayed on the display 11, as shown in FIG. 8, that is, shows the image information IF of the battle item CT that is being presently composed at a lower right of the screen without stopping the active state of the player character PC so as to inform the player that the battle item CT is now being composed. Then, the player character PC is possible to continue the action on the filed FLD based upon the instruction from the controller 10 even if the player character PC is composing the recovery item or the battle item.

The configuration of this image information IF is optional. In a case of FIG. 8, the image IMG1 of the arms ARM that the player character PC is presently using and the image IMG of the material items MT to be used for the battle item CT that is being composed are shown. The main controller 2 controls to keep the active state of the player character PC even if the recovery item or the battle item CT is being composed, thereby the player is able to get the player character PC to move and fight on the field FLD as usual through the operation of the controller 10.

EXPLANATION OF REFERENCE NUMBERS

1 . . . game apparatus
7 . . . active state judger, composition instruction judger, composed item provider (item composing controller)
9 . . . composed item provider (owned item controller)
CT . . . battle item
TB3 . . . material item storage (owned item table)
TB4 . . . arms table
PC . . . player character
FLD . . . field

The invention claimed is:

1. A game apparatus for advancing a scenario in a game such that a player character is moved on a field produced on a three dimensional virtual space in a memory by a player using a controller so as to obtain material items located on the field and to compose a predetermined composed item by combining two or more said material items obtained, comprising:
 a computer, coupled to the memory, and configured to process an operation command inputted by the player using the controller, wherein in an active state the operation command comprises at least one of a movement instruction, an attack instruction and a treatment instruction for increasing a physical power value of the player character that when executed shows the player character performing a corresponding action on a display coupled to the computer;
 wherein the computer is further configured to judge whether the player character on the field is in said active state such that the player character is able to immediately execute said operation command inputted through said controller;
 wherein the memory stores:
  a material item table that contains material items which are used in said game and corresponding graphic images thereof,
  an owned items table that contains said material items obtained by the player character in said field and a number of each of said material items obtained by said player character,
  a composed item table that contains a combination of two or more material items for composing said predetermined composed item; and
 wherein the computer is further configured to:
  judge whether an instruction of composing said predetermined composed item is outputted from said controller while the player character is in said active state,
  when the instruction of composing said predetermined composed item is outputted, read out the combination of the two or more material items for composing said predetermined composed item by referring to said composed item table,
  compose said predetermined composed item using two or more material items that are stored in said owned items table corresponding to the combination of the two or more material items for composing the predetermined composed item contained in the composed item table, update a number of material items owned in said owned items table for each of said material items that were used for said composing, and provide the player character with said predetermined composed item composed, for use by the player character in said active state;

whereby said predetermined composed item is composed while the player character is in said active state, wherein said memory further stores an arms table that shows an arms that said player character is presently using and a battle item corresponding to said arms, wherein if the instruction of composing said predetermined composed item is received during said active state, said computer is configured to identify said battle item corresponding to said arms and thereafter compose said battle item as said predetermined composed item during said active state in response to said instruction.

2. The game apparatus according to claim 1, wherein the arms table stores two or more arms with which the player character is able to be equipped and two or more battle items corresponding to these arms.

3. The game apparatus according to claim 1, wherein said predetermined composed items include a recovery item for increasing the physical power value of the player character, and said computer is further configured to successively execute the composition of the recovery item using one or more of said material items stored in said owned item table and increase the physical power value of the player character with each said composed recovery item if the instruction of composing said predetermined composed item is an instruction for composing said recovery item.

4. A non-transitory computer-readable storage medium tangibly embodying a program of instructions executable by a game computer that when executed advance a scenario based upon said program such that a player character is moved on a field that is produced in a three dimensional virtual space in a memory by a player using a controller so as to obtain material items located on the field and to compose a predetermined composed item by combining two or more material items obtained, the program of instructions configuring the game computer to:

process an operation command inputted by the player using the controller, wherein in an active state the operation command comprises at least one of a movement instruction, an attack instruction and a treatment instruction that when executed shows the player character performing a corresponding action on a display;

judge whether the player character on the field is in the active state such that the player character is able to immediately execute said operation command inputted through said controller;

store in said memory a material items table that contains material items which are used by said player character and corresponding graphic images thereof;

store in said memory an owned item table that contains said material items obtained by the player character in said field and a number of each of said material items obtained by said player character;

store in said memory a composed items table that contains said two or more material items for composing said predetermined composed item;

judge whether an instruction of composing said predetermined composed item is outputted from said controller while said player character is in said active state;

when the instruction of composing said predetermined composed item is outputted, determining a combination of the material items for composing said predetermined composed item by referring to said composed item table;

compose said predetermined composed item with the material items that are stored in said owned item table and corresponding to the two or more material items used for composing the predetermined composed item;

update a number of said material items obtained in the owned items table for each material item that was used for said composing; and provide the player character with said predetermined composed item, whereby said predetermined composed item is produced while the player character is in said active state, wherein said memory further stores an arms table that shows an arms that said player character is presently using and a battle item corresponding to said arms, wherein if the instruction to compose said predetermined composed item is received during said active state, the game computer is further configured to identify said battle item corresponding to said arms and thereafter compose said battle item as said predetermined composed item during said active state in response to the instruction to compose.

* * * * *